(12) United States Patent
Wahi et al.

(10) Patent No.: US 9,450,992 B2
(45) Date of Patent: Sep. 20, 2016

(54) NODE PROPERTIES IN A SOCIAL-NETWORKING SYSTEM

(71) Applicant: Facebook, Inc., Menlo Park, CA (US)

(72) Inventors: Ashish Wahi, Seattle, WA (US); Andrew Rothbart, Seatte, WA (US); Ming Hua, Palo Alto, CA (US); Rose Yao, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 248 days.

(21) Appl. No.: 14/061,516

(22) Filed: Oct. 23, 2013

(65) Prior Publication Data

US 2015/0113060 A1 Apr. 23, 2015

(51) Int. Cl.
*H04L 29/06* (2006.01)
*G06F 15/16* (2006.01)
*G06Q 50/00* (2012.01)

(52) U.S. Cl.
CPC ........... *H04L 65/403* (2013.01); *G06Q 50/01* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,942,956 B1* | 1/2015 | Perry | ...................... | H04L 45/22 703/1 |
| 2003/0009511 A1* | 1/2003 | Giotta | ...................... | G06F 9/54 709/201 |
| 2007/0230468 A1* | 10/2007 | Narayanan | ........ | H04L 29/12103 370/392 |
| 2010/0228614 A1* | 9/2010 | Zhang | .................... | G06Q 10/10 705/14.16 |
| 2010/0228631 A1* | 9/2010 | Zhang | ................ | G06Q 30/0269 705/14.66 |
| 2012/0016858 A1* | 1/2012 | Rathod | ............. | G06F 17/30867 707/706 |
| 2012/0158499 A1* | 6/2012 | Banadaki | ........... | G06Q 30/0254 705/14.52 |
| 2012/0173541 A1* | 7/2012 | Venkataramani | ... | G06F 17/3048 707/747 |
| 2013/0282889 A1* | 10/2013 | Tito | ........................ | H04L 41/22 709/224 |
| 2014/0067964 A1* | 3/2014 | Grishaver | .............. | G06Q 50/01 709/206 |
| 2014/0149507 A1* | 5/2014 | Redfern | .................. | H04L 65/00 709/204 |
| 2014/0173042 A1* | 6/2014 | Newton | .................. | H04L 67/42 709/219 |
| 2014/0173043 A1* | 6/2014 | Varney | .................... | H04L 67/42 709/219 |
| 2014/0173067 A1* | 6/2014 | Newton | .................. | H04L 67/42 709/221 |
| 2014/0173135 A1* | 6/2014 | Varney | .................... | H04L 67/42 709/245 |
| 2015/0006606 A1* | 1/2015 | Fleury | .................... | H04L 67/10 709/201 |
| 2015/0019639 A1* | 1/2015 | Marlow | .................. | H04L 67/22 709/204 |
| 2015/0032866 A1* | 1/2015 | Johnson | ............. | G06Q 30/0201 709/221 |

\* cited by examiner

*Primary Examiner* — Saket K Daftuar
(74) *Attorney, Agent, or Firm* — Baker Botts L.L.P.

(57) ABSTRACT

In one embodiment, one or more server computing devices receive, from a client computing device, a request for first information associated with a first node of a graph. The one or more server computing devices determine whether the first node is associated with a cluster of nodes. A cluster of nodes includes one or more concept nodes of the graph that are related to each other. When the first node is associated with a cluster of nodes, the one or more server computing devices access the cluster of nodes that the first node is associated with, obtain second information from one or more of the nodes in the cluster of nodes that the first node is associated with, and provide the second information for rendering by the client computing device.

20 Claims, 4 Drawing Sheets

NODE PROPERTIES IN A SOCIAL-NETWORKING SYSTEM

TECHNICAL FIELD

This disclosure generally relates to a social-networking system.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

In particular embodiments, a client computing device may request information (e.g. a property) associated with a first node of a graph of a social-networking system. One or more server computing devices (e.g. of the social-networking system) may receive this request for information and determine if the first node is associated with a cluster of nodes. The cluster of nodes, for example, may include multiple nodes of the graph that are related to each other. Nodes may be related to each other, for example, if they are of the same type or if they include one or more properties having the same value (e.g. the same value for the property "title" for a cluster of nodes representing books). If the first node is associated with a cluster of nodes, the cluster is accessed. Information is obtained from one or more nodes in the cluster of nodes. For example, if the first node represents a book but the first node includes a value for the property "title" but not a value for the property "cover image," then an image of the book cover may be obtained from one or more nodes in a cluster of nodes having the same value for the property "title" as the first node. The information obtained from the cluster of nodes is provided by the server computing devices to the client computing device for rendering (e.g. for displaying both the book title and cover image when rendering content referencing the book node).

The embodiments disclosed above are only examples, and the scope of this disclosure is not limited to them. Particular embodiments may include all, some, or none of the components, elements, features, functions, operations, or steps of the embodiments disclosed above.

DESCRIPTION OF EXAMPLE EMBODIMENTS

Figure 1:
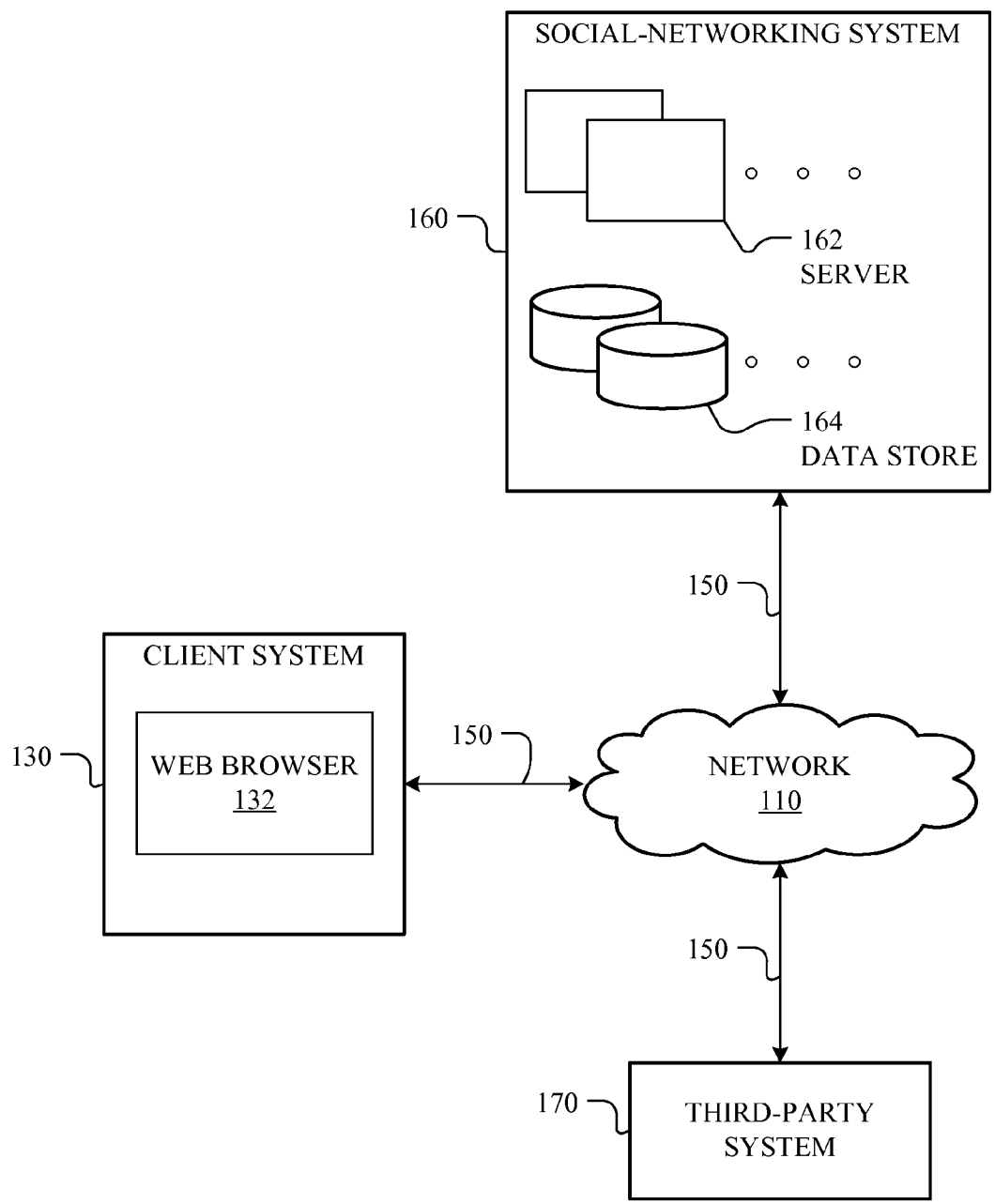
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 164 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Figure 2:
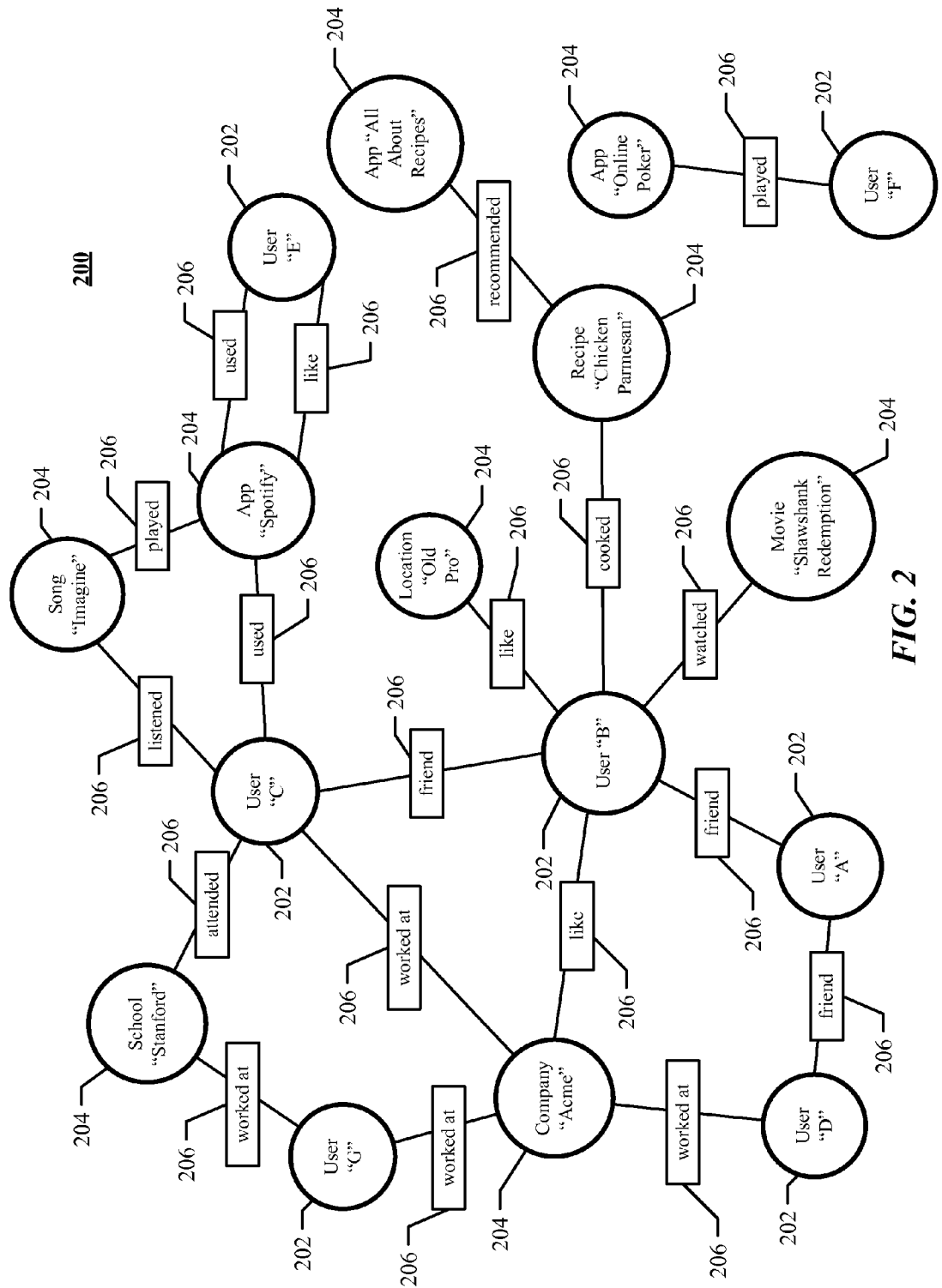
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 130 to send to social-networking system 160 a message indicating the user's action. In response to the message, social-networking system 160 may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

As described herein, in particular embodiments, a concept node may be associated with concept information. Concept information associated with a concept node may, for example, include one or more properties associated with the concept node, and the properties may each describe or include information related to the concept node. As an example, a concept node may represent a book, and properties of such a concept node may include International Standard Book Number (ISBN), title, author, image, description, number of pages, publication date, price, reviews, or rating. As another example, a concept node may represent a singer with example properties that may include one or more of the following: biographical information, list of albums, list of songs, lyrics, upcoming performance dates, reviews, images, or performance videos. Example properties of a concept node may include: name, title, author, company, school, description, location, address, phone number, website, price, distance, quantity, menu, rating, or image. This disclosure contemplates any suitable properties of a concept node.

In particular embodiments, two or more concept nodes may be associated with the same or similar concepts and may be associated with concept information including one or more same or similar characteristics, attributes, or properties. As an example, two or more concept nodes that each represent a book may have the same title. As another example, two concept nodes may correspond to different webpages (e.g., third-party webpages or webpages within a social-networking system) about the same concept. For example, a popular restaurant may have several webpages authored by different review sites or bloggers, and each of these webpages may correspond to a concept node representing the restaurant. For example, a popular music band may have many fan pages hosted by various web sites, and each of these fan pages may correspond to a concept node representing the band. In particular embodiments, with respect to a first concept node, one or more second concept nodes including one or more properties that substantially match one or more properties of the first concept node may be identified. In particular embodiments, a meta-node including one or more of the matching properties may be created (e.g., by one or more servers of a social-networking system) and included in the social graph comprising the first and second concept nodes. One or more edges between the meta-node and each of the first and second concept nodes may be included in the social graph. The meta-node and the first and second concept nodes connected to the meta-node via one or more edges may be referred to as a cluster of nodes. The meta-node of a cluster of nodes may include one or more of the matching properties of the first concept node and one or more second concept nodes, and, in particular embodiments, it may also include one or more other (e.g. non-matching) properties taken from nodes of the cluster. In particular embodiments, a meta-node is not visible to users of the social networking system. For example, a meta-node may not be associated with a corresponding web page that is visible or accessible to users of the social networking system. Particular embodiments may utilize one or more systems, components, elements, functions, methods, operations, or steps disclosed in U.S. patent application Ser. No. 13/316,222, filed 9 Dec. 2011, which is incorporated by reference and which describes methods for determining concept nodes corresponding to the same or similar concepts, creating meta-nodes, and ranking concept nodes corresponding to a particular meta-node.

As described herein, a user of a social-networking system may perform an action or activity with respect to a concept node of a social graph of the social-networking system including, for example, actions such as: "like," "check in," "eat," "recommend," or any other suitable action or activity. A user may, for example, create a content item such as a post (e.g. on a profile page of the user or another user), a status update (e.g. displayed in a newsfeed of aggregated stories or status updates), a comment (e.g. on a status update or story displayed on a profile page or in the newsfeed), or a message including one or more references (e.g. tags or links) to one or more concept nodes of the social graph. As an example, a user may "like" a particular concept node representing a singer, and this may be represented visually on a profile page associated with the user (e.g. via an image associated with the concept node displayed within a collection of images associated with nodes "liked" by the user) or in a story about the user presented in a newsfeed. As described herein, any suitable action or activity of a user with respect to a concept node of the social graph may cause an edge to be created between a node associated with the user and the concept node.

In particular embodiments, the social-networking system (e.g. social-networking system 160) may receive a request from a client device (e.g. client system 130) to access information associated with a particular concept node. The social-networking system may receive such a request when the client device seeks to access and display a web page or portion of a web page associated with a particular concept node. For example, a user of the social-networking system, User A, may be associated with a user node represented by a profile page that includes a reference to a concept node associated with a particular restaurant. Another user, User B, may view the profile page associated with User A's user node using a client device (e.g. a laptop). A web browser of User B's client device may, for example, send a request to one or more servers of the social-networking system to access the profile page of User A. The social-networking system may receive this request and provide to the web browser of the client device content for rendering and presentation to User B. As an example, in response to the request to access the profile page of User A, the social-networking system may provide an image associated with the concept node of the restaurant referenced by User A's profile page for rendering by the web browser. The social-networking system may similarly provide concept information (including, e.g., properties) associated with a concept node referenced by a web page (or portion of a web page) any time the requesting client device seeks to render the web page or portion of the web page. Examples when the requesting client device seeks to render a web page or portion of a web page referencing a concept node include when a user of the client device: (1) performs a search on the social-networking system (e.g. when search results or suggested search results corresponding to one or more concept nodes are to be displayed in a web page), (2) views another user's profile page (e.g. including one or more references to concept nodes), (3) views a page associated with a concept node (including, e.g., one or more references to other concept nodes), (4) views a page including a newsfeed or aggregation of stories of multiple users (e.g. including status updates or any other actions or activities referencing one or more concept nodes), or (5) views a message (e.g. including one or more references to concept nodes).

In particular embodiments, a concept node may be associated with a node type and a property specification, where a property specification may include a set, format, ordering, or content of one or more properties of a particular type of concept node. A node type or property specification may, for example, be defined by a user or developer associated with a social-networking system. As an example, a property specification for a concept node of the node type "book" may include a list of particular properties (e.g., ISBN, title, author, image, description, number of pages) that are included in a book-type concept node. Property specifications for other types of concept nodes (e.g. movies, television shows, or music artists or albums) may be different. This disclosure contemplates any suitable concept nodes associated with any suitable property specifications.

In particular embodiments, a concept node (e.g. of a particular type and having a property specification) may have one or more unspecified or missing properties or unspecified or missing portions of properties (e.g. as compared with the property specification). In particular embodiments, an unspecified or missing property may include a property that has one or more missing elements or portions, such as for example a missing property name, missing property value, or a missing portion of a property value. In particular embodiments, if a concept node has one or more unspecified or missing properties, values for missing properties may be obtained from other sources such as, for example, other concept nodes. As an example and not by way of limitation, a concept node representing a book may have a node type "book" and may include an ISBN property but may be missing a book-title property, which is part of the property specification for a book type of concept node.

In particular embodiments, in response to a request from a client device for information associated with a first concept node (e.g. a request associated with a web page or portion of a web page referencing the first concept node), the social-networking system may provide to the client device concept information associated with a second concept node. The second concept node may, for example, be of the same type as the first concept node and may, for example, belong to a cluster of nodes to which the first concept node belongs in the social graph. As an example, User A may post a status update in the social-networking system, tagging (or otherwise referencing or linking) a first concept node of the node type "book" associated with a book titled "Book 1." In this example, the node type "book" has a property specification that includes the property "author." However, in this example, the particular concept node for "Book 1" that User A tagged in the status update does not include the property (or a value for the property) "author." The social-networking system, upon receiving a request from a client device associated with loading the status update of User A, may determine that the particular concept node for "Book 1" that User A tagged belongs to a cluster of concept nodes (e.g. of node type book), all related because they share the same value for the property "title"—"Book 1." As described in greater detail below, the social-networking system may retrieve the value for the property "author" from a node of the cluster (e.g. a meta-node or other concept node) and return this value to the requesting client device for rendering at the client device. At the client device, the status update as rendered would include both the title information (from the first concept node) and the author information for "Book 1," even though User A tagged a concept node missing the property value for author information.

An example flow may proceed as follows. Upon receiving a request from a client device for information, e.g. a value of a particular property, in association with rendering content referencing a first concept node, the social-networking system may first determine if the first concept node includes a value for the property. If the first concept node does include a value for the property, the social-networking system may, in particular embodiments return this value to the client device for rendering. If the first concept node does not include a value for the property, the social-networking system may determine if the first concept node is part of a cluster of nodes (e.g. nodes of the same node type and sharing one or more properties with the first concept node). If the first concept node is not part of a cluster of nodes, the social-networking system may, in particular embodiments, return nothing for the requested property to the client device, which will not render information for the requested property. If, however, the first concept node is part of a cluster of nodes, then the social-networking system may query the cluster of nodes for the requested property.

In particular embodiments, the social-networking system queries the cluster of nodes for the requested property by querying the meta-node of the cluster of nodes. In particular embodiments, the meta-node includes an indication (e.g. a node identifier) of the "best" node in the cluster. The "best" node may, for example, be a predetermined node in the cluster that is the "best" regardless of the type of the first concept node or the requested property. In particular embodiments, the "best" node in the cluster may not include the requested property, in which case the social-networking system may return nothing for the requested property value to the client device. The "best" node in the cluster may, for example, be chosen by an administrator of the social-networking system. For example, an official (e.g., verified and managed) page for a particular celebrity may be determined to be the "best" node in a cluster of concept nodes associated with the celebrity. In general, any suitable criteria may be used to rank nodes in a cluster and select (e.g. either in a pre-determined or dynamic fashion and either algorithmically or by one or more administrators of the social-networking system) the "best" node in the cluster. Example criteria may include node popularity (e.g. a number of edges connecting the node to nodes representing users of the social-networking system), node traffic (e.g. a number of visits to a page associated with the node), recency of traffic to the node (e.g. the date of the last visit to a page associated with the node), credibility of the node (e.g. whether the node is verified or "official" in some capacity), explicit user feedback with respect to the node (e.g. a number of "likes" the node or content associated with the node have received), whether the node corresponds to a profile page of the social-networking system or a third-party web page, whether the node belongs to a whitelist (e.g. a list of pre-approved or verified concept nodes, including nodes with information pulled from licensed or partnered third-party services), whether the node belongs to a blacklist, etc. The "best" node in the cluster may also be determined based on criteria including the type of the first concept node or the requested property, as well as information associated with the requesting client device (or a user associated with the client device) or where the first concept node is referenced (e.g. in a post, a status update, a profile page, etc.). As an example, if the type of the first concept node is "movie" and the requested property is "image," then the "best" node in the cluster may be determined to be the node with the highest-resolution image having a particular (e.g. square) aspect ratio or size. As another example, if the client device requesting the "image" property for the movie-type first concept node is located in Latin America, then the "best" node in the cluster may be determined to be the node with the highest-resolution image having a square aspect ratio and having Spanish language text in the image (e.g. determined by any suitable character recognition algorithm). This disclosure contemplates any suitable method or criteria for selecting the "best" node of a cluster, including, for example, any suitable method, criteria, or combination of methods or criteria. However the "best" node is determined, if the "best" node includes the requested property, the meta-node of the cluster may return, as a response to the query, the "best" node's value of the requested property. The social-networking system may then return this value to the requesting client device for rendering at the client device in association with the first concept node. In particular embodiments, more than one value for a property (or properties) may be returned to a requesting client device for rendering in association with the first concept node. As an example, if the first concept node is lacking a value for the property "image," the social-networking system may determine the top N (e.g. 10) values for the "image" property in the cluster of nodes and return these N values to the client device for rendering. In particular embodiments, the N values may be processed, either by the social-networking system (e.g. multiple images may be cropped or "stitched" together to form a single image) or by the client device.

In particular embodiments, the "best" node in a cluster of nodes may be a constructed node of the cluster (e.g. a node that is not created, owned, or accessible by any user or entity of the social-networking system). For example, in each cluster, a "super" node may be constructed, the "super" node including the superset of properties of the nodes of the cluster. That is, any property that any node in the cluster includes is also a property included in the "super" node. For example, if a node in a two-node cluster is missing the property "author" but includes the property "title," and the other node in the two-node cluster is missing the property "title" but includes the property "author," the "super" node for the cluster would include both the properties "title" and "author." The value of each property in a "super" node of a cluster may, for example, be the "best" value for that property among all the nodes in the cluster. In particular embodiments, the "best" value for a given property of the "super" node may be determined by determining which nodes of the cluster include a value for the property, ranking these nodes using any suitable ranking method or criteria, and selecting the value of the property from the top-ranked node. This disclosure contemplates any suitable method or criteria for selecting the "best" value for a given property including, but not limited to, any of the methods or criteria described herein with respect to ranking nodes.

In particular embodiments, when the first concept node includes a value for a requested property, the social-networking system may still determine if the first concept node is part of a cluster of nodes and query the cluster for the requested property. For example, if the first concept node is an unofficial, user-generated page for a concept and includes few (or low quality) values for properties of nodes of its same type (e.g. low-resolution images), then it may be desirable to seek one or more property values (e.g. images) from a cluster to which the first concept node belongs. In yet other embodiments, it may be desirable when providing data for rendering at the client device not to override the values of existing properties or supplement missing properties of the first concept node. For example, there may be no overriding or supplementing of properties if the first concept node is an official or verified node, if a user who has referenced the first concept node (e.g. on the user's profile page) has indicated it to be a specifically desired node (e.g. through feedback in the user interface), if a user (e.g. a user viewing another user's profile page) has indicated other nodes to be undesirable (e.g. through feedback in the user interface), or if internal testing is being conducted on the first concept node. Although the social-networking system may, in particular embodiments described herein, override existing property information or provide missing property information for a first concept node for a client device to render, the actual properties of the first concept node need not be modified (e.g. in a data store of the social-networking system). In particular embodiments, the replacement or supplemental properties are displayed only at render-time on the client device.

Figure 3:
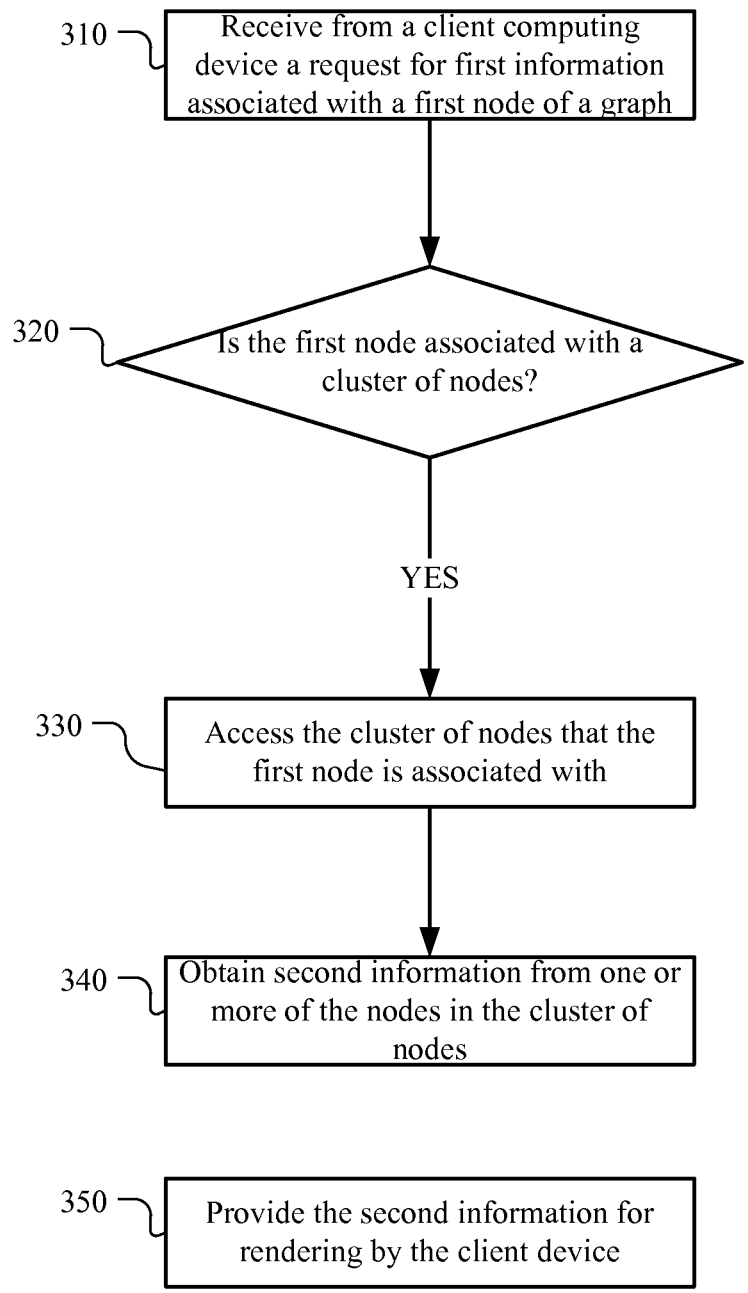
FIG. 3 illustrates an example method for providing property information with respect to a node of a social graph.

FIG. 3 illustrates an example method 300 for providing property information with respect to a concept node. The method may begin at step 310, where one or more server computing devices (e.g. of a social-networking system) receive from a client computing device (e.g. a browser on a laptop) a request for first information (e.g. one or more properties) associated with a first node of a graph of the social-networking system. At step 320, the server computing device or devices determine whether the first node is associated with a cluster of nodes, wherein the cluster of nodes includes a plurality of concept nodes of the graph that are related to each other (e.g. by being nodes of the same type or by sharing values for one or more properties). At step 330, if the first node is associated with a cluster of nodes, then the cluster of nodes is accessed. At step 340, second information (e.g. one or more values of one or more properties) is obtained from one or more of the nodes in the cluster. At step 350, the server computing device or devices provide the second information for rendering at the client computing device. Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for providing property information with respect to a concept node including the particular steps of the method of FIG. 3, this disclosure contemplates any suitable method for providing property information with respect to a concept node including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
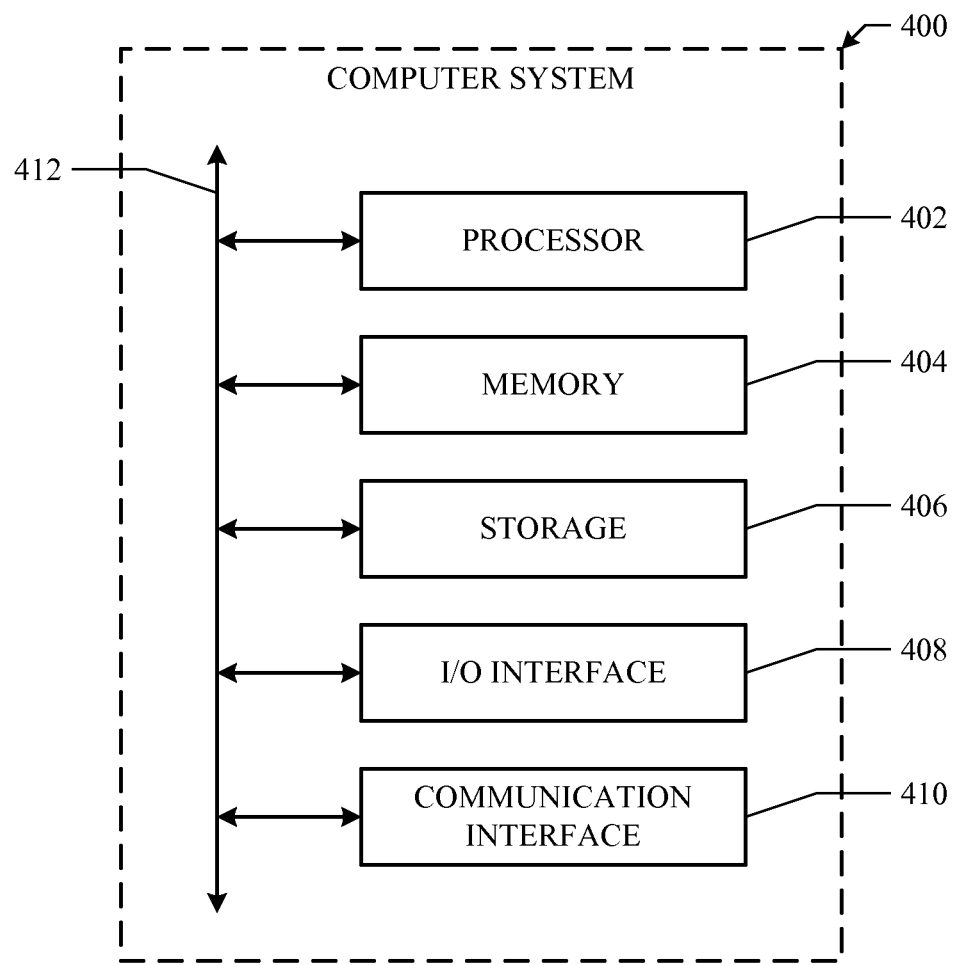
FIG. 4 illustrates an example computer system.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
by one or more server computing devices, receiving from a client computing device a request for first information associated with a first node of a graph;
by one or more server computing devices, determining that the first information cannot be provided to the client computing device because the first node of a graph does not include the first information;
by one or more server computing devices, determining whether the first node is associated with a cluster of nodes, wherein the cluster of nodes comprises a plurality of concept nodes of the graph that have a same node type and share one or more properties with the first node; and
by one or more server computing devices, when the first node is associated with a cluster of nodes:
accessing the cluster of nodes that the first node is associated with;
querying the cluster of nodes for the requested first information;
obtaining second information from one or more of the nodes in the cluster of nodes that the first node is associated with, wherein the second information comprises the requested first information; and
providing the second information for rendering by the client computing device.

2. The method of claim 1, wherein:
the request is sent by the client computing device in connection with presentation of a content item at the client computing device; and
the content item comprises a reference to the first node.

3. The method of claim 2, wherein the reference was provided by a creator of the content item.

4. The method of claim 3, wherein the content item is:
a post;
a status update;
a comment; or
a message.

5. The method of claim 1, wherein the second information is rendered in place of the first information.

6. The method of claim 1, wherein the second information is obtained from a pre-determined node of the cluster.

7. The method of claim 6, wherein the pre-determined node comprises one or more properties, each of the one or more properties being obtained from other nodes of the cluster, and wherein the second information comprises a value of one of the properties.

8. One or more computer-readable non-transitory storage media embodying software that is operable when executed to:
receive from a client computing device a request for first information associated with a first node of a graph;
determine that the first information cannot be provided to the client computing device because the first node of a graph does not include the first information;
determine whether the first node is associated with a cluster of nodes, wherein the cluster of nodes comprises a plurality of concept nodes of the graph that have a same node type and share one or more properties with the first node; and
when the first node is associated with a cluster of nodes:
access the cluster of nodes that the first node is associated with;
query the cluster of nodes for the requested first information;
obtain second information from one or more of the nodes in the cluster of nodes that the first node is associated with, wherein the second information comprises the requested first information; and
provide the second information for rendering by the client computing device.

9. The media of claim 8, wherein:
the request is sent by the client computing device in connection with presentation of a content item at the client computing device; and
the content item comprises a reference to the first node.

10. The media of claim 9, wherein the reference was provided by a creator of the content item.

11. The media of claim 10, wherein the content item is:
a post;
a status update;
a comment; or
a message.

12. The media of claim 8, wherein the second information is rendered in place of the first information.

13. The media of claim 8, wherein the second information is obtained from a pre-determined node of the cluster.

14. The media of claim 13, wherein the pre-determined node comprises one or more properties, each of the one or more properties being obtained from other nodes of the cluster, and wherein the second information comprises a value of one of the properties.

15. A system comprising:
one or more processors; and
a memory coupled to the processors comprising instructions executable by the processors, the processors being operable when executing the instructions to:
receive from a client computing device a request for first information associated with a first node of a graph;
determine that the first information cannot be provided to the client computing device because the first node of a graph does not include the first information;
determine whether the first node is associated with a cluster of nodes, wherein the cluster of nodes comprises a plurality of concept nodes of the graph that have a same node type and share one or more properties with the first node; and
when the first node is associated with a cluster of nodes:
access the cluster of nodes that the first node is associated with;
query the cluster of nodes for the requested first information;
obtain second information from one or more of the nodes in the cluster of nodes that the first node is associated with, wherein the second information comprises the requested first information; and
provide the second information for rendering by the client computing device.

16. The system of claim 15, wherein:
the request is sent by the client computing device in connection with presentation of a content item at the client computing device; and
the content item comprises a reference to the first node.

17. The system of claim 16, wherein the content item is:
a post;
a status update;
a comment; or
a message.

18. The system of claim 15, wherein the second information is rendered in place of the first information.

19. The system of claim 15, wherein the second information is obtained from a pre-determined node of the cluster.

20. The system of claim 19, wherein the pre-determined node comprises one or more properties, each of the one or more properties being obtained from other nodes of the cluster, and wherein the second information comprises a value of one of the properties.

* * * * *